June 1, 1943.  A. R. HITE ET AL  2,320,730
BEVERAGE MIXER
Filed April 7, 1942  3 Sheets-Sheet 1

Inventors
Alonzo R. Hite,
Joseph N. Hendrix,

Attorneys

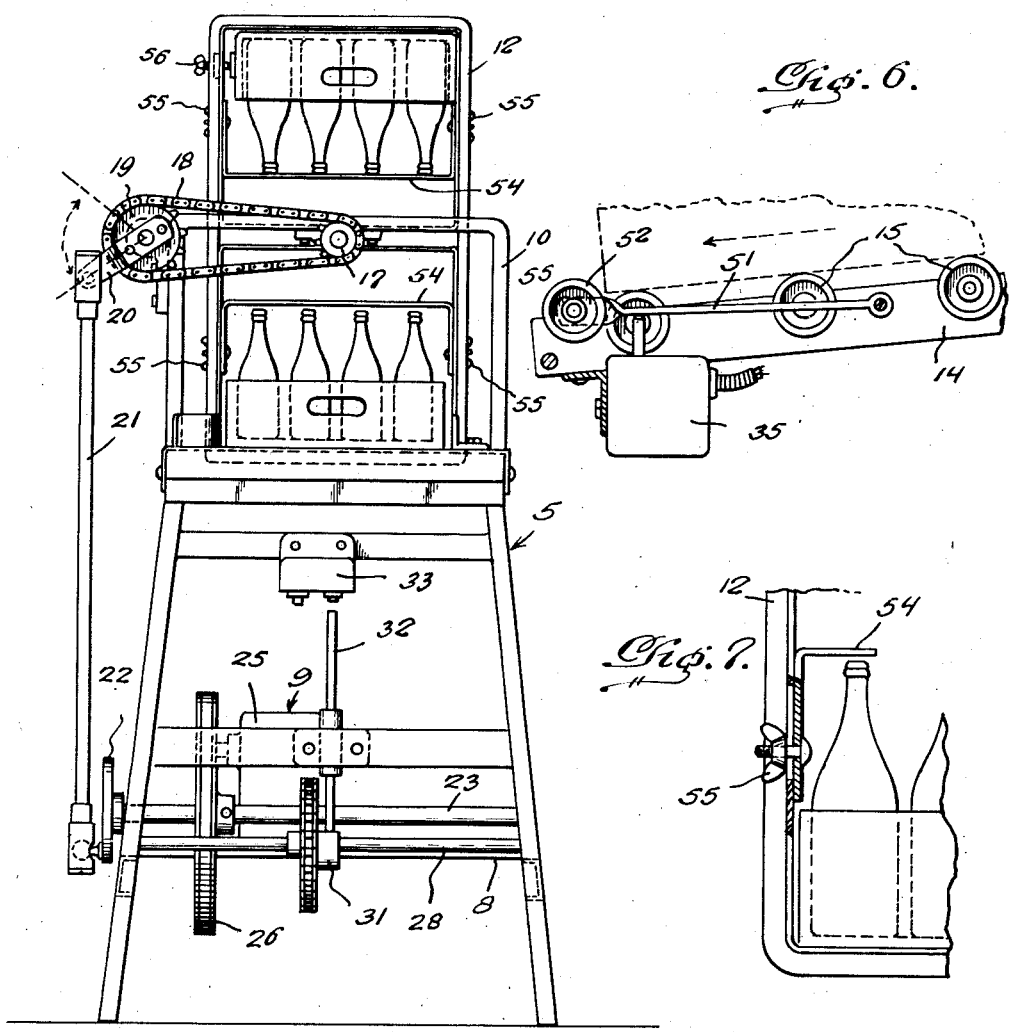

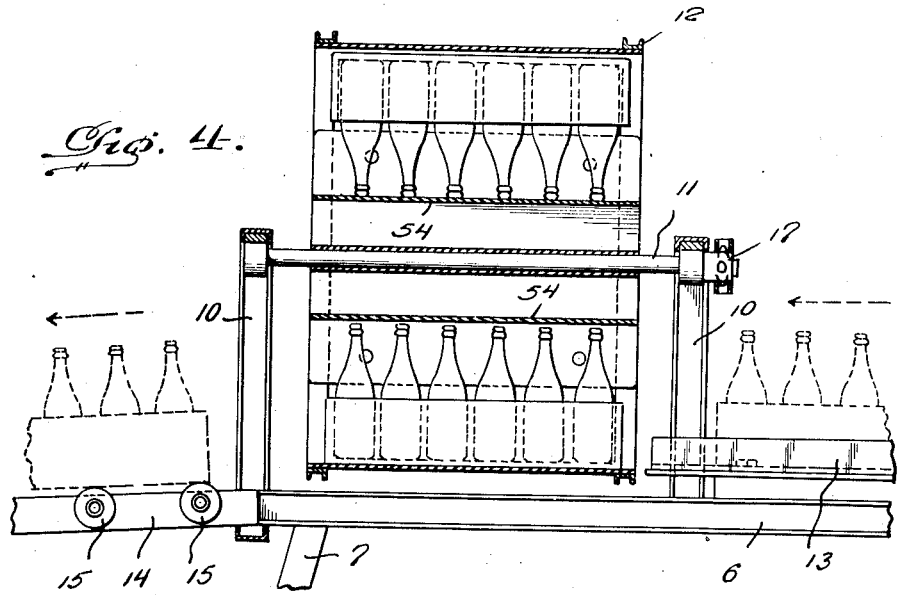
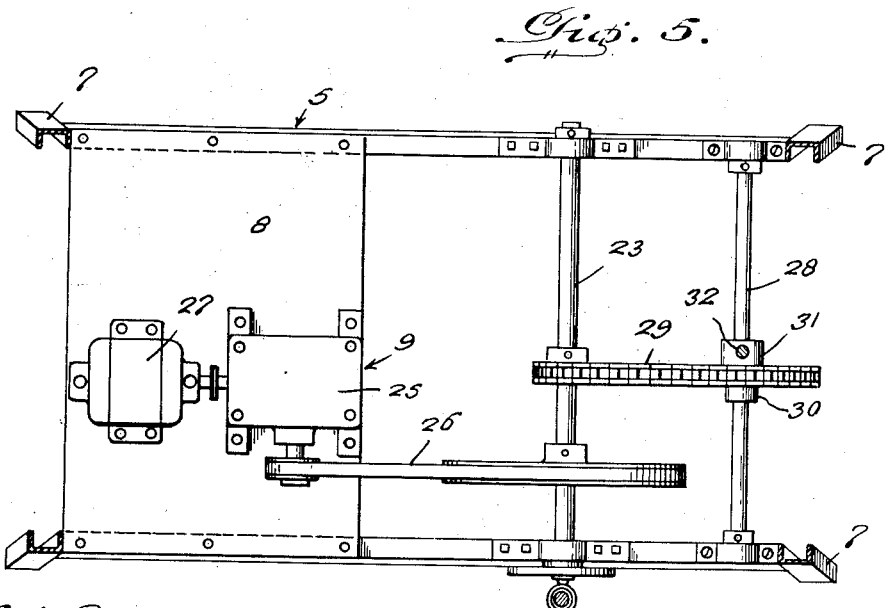
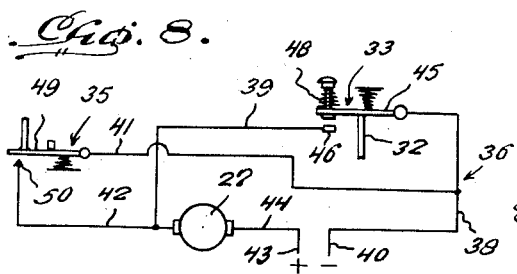

Patented June 1, 1943

2,320,730

UNITED STATES PATENT OFFICE 2,320,730

BEVERAGE MIXER

Alonzo R. Hite and Joseph N. Hendrix,
Mattoon, Ill.

Application April 7, 1942, Serial No. 438,032

1 Claim. (Cl. 259—54)

This invention relates to a mixer especially constructed for mixing bottled beverages arranged or grouped in cases customarily employed in handling bottled beverages.

After the standing or storing of bottled beverages for a period of time, it is not unusual for the ingredients of the beverages to separate and in order for the beverage to be brought in proper condition for use, a thorough shaking of the beverage must be resorted to. Also, when filling bottles with a beverage, it is customary to first place in the bottles the syrup and then add carbonated water or similar liquid and then the bottles must be shaken or similarly moved to bring about mixing of the syrup and the water or other liquid. Therefore, the primary object of this invention is the provision of a power operated machine in which cases of bottled beverages may be placed and receive a thorough agitation and removed by the insertion in the machine of another case after a predetermined operation of said machine so that a large number of cases of bottled beverages may be efficiently agitated with a minimum expenditure of manual labor.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which Figure 1 is a side elevation illustrating a beverage mixer constructed in accordance with our invention.

Figure 3 is a front elevation illustrating the device.

Figure 4 is a fragmentary vertical sectional view illustrating cases of bottled beverages as they move into and from the agitating mechanism of the device.

Figure 5 is a sectional view taken on the line 5—5 of Figure 1.

Figure 6 is a detail sectional view taken on the line 6—6 of Figure 2.

Figure 7 is a detail sectional view taken on the line 7—7 of Figure 1.

Figure 8 is a diagrammatical view showing the wiring diagram and showing electric circuits and switches therein for the control of operation of the machine.

Figure 1:
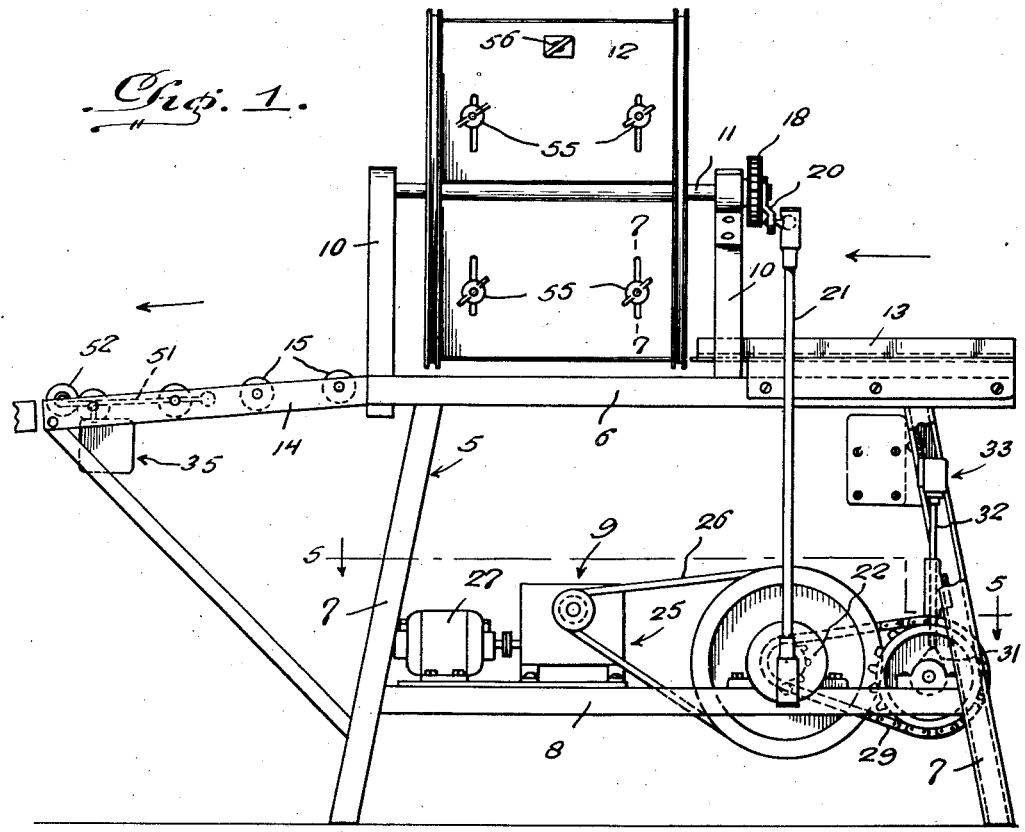
Figure 2:
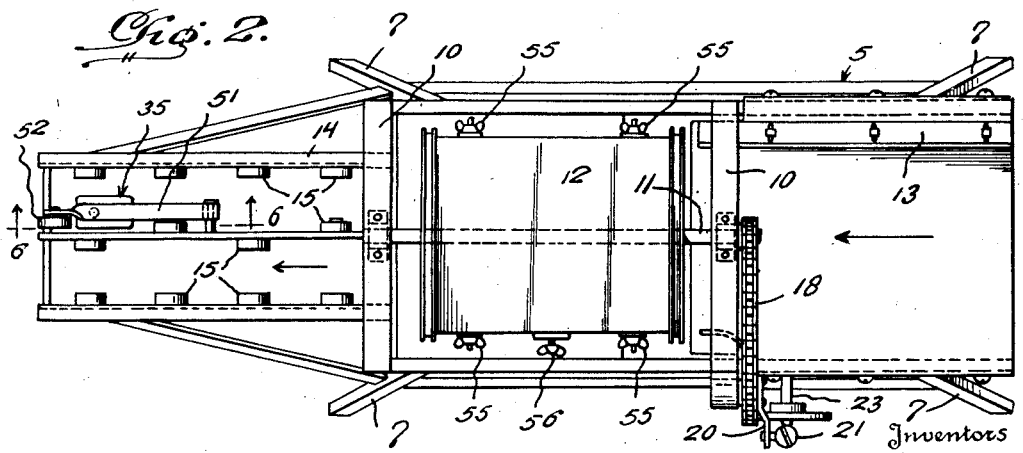
Figure 2 is a top plan view illustrating the device.

Referring in detail to the drawings, the numeral 5 indicates in entirety the supporting structure of the present invention and which is in the form of a table-like structure including a top 6 supported by legs 7. The legs 7 are tied together by a shelf 8 arranged under the top 6 for the support of the power mechanism 9 of this invention.

Rising vertically from the top 6 are spaced standards 10 which rotatably support a horizontally arranged shaft 11. Mounted on the shaft 11 is a rack 12 for the accommodation of cases of bottled beverages as shown in Figures 3 and 4 of the drawings. The rack 12 is adapted to be rotated in opposite directions several times during each cycle of operation of the machine so as to thoroughly agitate the bottled beverages. The rack 12 is open at opposite ends thereof so that the cases of beverages may be conveniently placed into and removed from the rack. At the receiving end of the rack 12 the table 6 has thereon guides 13 to facilitate the movement of a case of bottled beverage into the rack.

The table 6 at the other end from the rack is provided with an inclined portion 14 on which is journaled a series of anti friction rollers 15, the purpose of which is to permit a case of bottled beverage on leaving the rack 12 to slide freely toward a conveyor or similar device, a fragmentary portion of which is indicated by the character 16 and forms no part of the present invention.

A sprocket gear 17 is secured to one end of the shaft 11 and has trained thereover a sprocket chain 18. The sprocket chain 18 is also trained over a sprocket gear 19 journaled on the supporting structure 5 and has secured thereto a pitman arm 20. A pitman 21 has a ball and socket connection with the arm 20 and a like connection with an eccentric 22 secured on a power driven shaft 23 journaled on the shelf 8. The drive described will impart to the rack 12 rotation about a horizontal axis in opposite directions so that the cases of bottled beverages will be turned upside down and returned to an upstanding position bringing about a thorough agitation of the beverages therein.

A gear reduction mechanism 25 of a conventional construction is mounted on the shelf 8 and is belted to the shaft 23, as at 26. An electric motor 27 is operatively connected to the reduction gear mechanism 25 and is supported by the shelf 8. The shaft 23 drives a cam shaft 28 journaled on the shelf by a sprocket chain 29 and associated sprocket gears 30, one of which is secured to the shaft 23 and the other secured to the shaft 28.

A cam 31 is secured to the cam shaft 28 employed for operating a plunger 32 slidably mounted on the supporting structure 5 for the operation of an electric switch 33.

Located adjacent the discharge end of the inclined portion 14 of the top 6 is a switch 35. The switch 33 is included in an electric circuit 36 for the electric motor 27 and the switch 35 is included in an electric circuit 37 for the electric motor 27. The electric circuit 36 includes electric conductors 38 and 39. The conductor 38 is connected to one terminal of the switch 33 and to an electric feed line 40. The electric conductor 39 is connected to the other terminal of the switch 33 and to one terminal of the electric motor 27. The electric circuit 37 includes conductors 41 and 42. The conductor 42 is connected to said terminal of the electric motor 27 and to one terminal of the switch 35. The conductor 41 is connected to the other terminal of the switch 35 and to the electric lead 40. The other terminal of the electric motor 27 is connected to the electric lead 43 by a conductor 44.

The electric switches 33 and 35 are more or less of a conventional construction. However, the electric switch 33 is of a self-closing type including a spring influenced movable contact 45 and a fixed contact 46. The movable contact 45 is operated or engaged by the plunger 32 and has slidably mounted thereon a spring influenced plunger 48 which may be manually moved in engagement with the fixed contact 46 regardless of the position of the movable contact 45, that is, the movable contact 45 may be in circuit breaking position under the influence of the plunger 32 still the plunger 48 may be manually pushed into engagement with the contact 46 for closing the electric circuit 36.

The switch 35 is of the self-opening type, including a spring influenced pivotal contact 49 and a fixed contact 50. Engaging with the contact 45 is a pivotally mounted arm 51 mounted on the inclined portion 14 of the top 6 and carries a roller 52 located in the path of movement of a case of bottled beverage moving over the inclined portion 14 so that the switch 35 or the movable contact 49 thereof will be brought into engagement with the contact 50 closing the circuit 37.

The rack 12 is substantially rectangular shaped having its opposite ends fully open. Adjustably mounted in the rack 12 are retainer plates 54 each of substantially U-shape held in adjusted position by wing nuts 55. The purpose of the retainer plates 54 is to retain the bottles in the cases and the latter from having undue movement in the rack 12, as shown in Figure 4. The rack 12 is provided with a set screw 56 for the purpose of anchoring one of the cases in the rack for an indefinite period. This case which is anchored in the rack is employed for counterbalancing the other case in the rack during the cycle of operation of the machine. By releasing the wing nuts 55, the retaining plates 54 may be shifted in the rack 12 for accommodating bottles of different heights.

It is to be understood that during one cycle of operation of the machine, the rack rotates in opposite directions several times and on the completion of each cycle of operation, the rack 12 comes to rest with one of the cases disposed lowermost and the other case disposed uppermost directly thereover. The lowermost case can be quickly slid from the rack by the incoming case and pass downwardly over the inclined portion 14 of the table onto the conveyor or similar device 16.

When the machine is idle or in non-operation, the cam 31 holds the switch 33 in circuit-breaking position which prevents operation of the electric motor 27 by the electric circuit 36. The electric circuit 37 is broken to the electric motor 27 by the switch 35 at this time.

To start the machine in operation after the arranging of cases of bottled beverages in the rack, as shown in Figure 4 or Figure 3, the operator presses the plunger 48 of the switch 33 completing the circuit 36 thereby for a period of time long enough for the cam to move out of engagement with the plunger and as soon as the plunger 32 assumes the stated position, the switch 33 automatically closes due to the pivotal contact 35 moving into engagement with the contact 46. The motor continues to operate for rotating the rack 12 in opposite directions for several times or until the cam 31 again raises the plunger 32 to disengage the contact 45 from the contact 46 of the circuit 36, automatically breaking the circuit 36 and stopping the motor 27. The operator then shoves a case into the rack 12 which shoves the lowermost case from the rack 12. The case leaving the rack slides downwardly over the inclined portion 14 of the top 6 and contacts the roller 52 causing pivotal movement of the arm 51 which operates the switch 35 into circuit closing position completing the electric circuit 37, starting the electric motor 27 so that the second cycle of operation of the machine begins. The case passing over the inclined portion 14 bringing about closing of the switch 35 continues its movement onto the conveyor 16. However, the period of time spent by the case when in engagement with the roller 52 is sufficient for the operation of the electric motor 27 to move the cam 31 so that the plunger 32 becomes disengaged from the contact 45 of the switch 33, permitting the latter to automatically close the circuit 36 and thereby continue the operation of the electric motor for the second cycle of operation of the rack.

Thus it will be seen that the stopping and starting of the rack in its cycles of operation is entirely automatic by the feeding into and from the rack the various cases which only requires a minimum amount of manual effort permitting the agitation of the various cases of bottled beverages to be rapidly and thoroughly carried out.

While we have shown and described the preferred embodiment of our invention, it will be understood that minor changes in construction, combination and arrangement of parts may be made without departing from the spirit and scope of the invention as claimed.

Having thus described the invention, what we claim is:

In a bottled beverage mixer, a supporting structure, an agitator rack mounted on said supporting structure including receiving and discharging ends to permit bottled beverages in cases to be slid therein at the receiving end and to permit a case of bottled beverage to be forced therefrom at the discharge end by the incoming case; an inclined ramp at the discharge end of the rack to receive thereon the discharged case for gravitation over said ramp, an electric motor mounted on the supporting structure, a drive means connecting said motor to the rack for rotating the latter in opposite directions, a timing cam driven by said motor and rotatably mounted on the supporting structure, a pair of electric circuits electrically connected to said motor and both connected to an electric source, a self-closing electric switch mounted on the supporting structure and electrically connected to one of the circuits for opening and closing thereof to rotate the rack by the motor for a predetermined length of time to provide cycles of operation to the rack, a plunger for opening said switch and operated by the cam to bring about stopping of the motor to complete a cycle of operation of the rack, and a self-opening switch electrically connected in the other circuit and closed by movement of a case over the ramp to start the motor after the completion of a cycle of operation of the rack and for a length of time sufficient for the cam to move to free the first switch of the plunger to permit said first switch to close for another cycle of operation of the rack.

ALONZO R. HITE.
JOSEPH N. HENDRIX.